Figure 1:
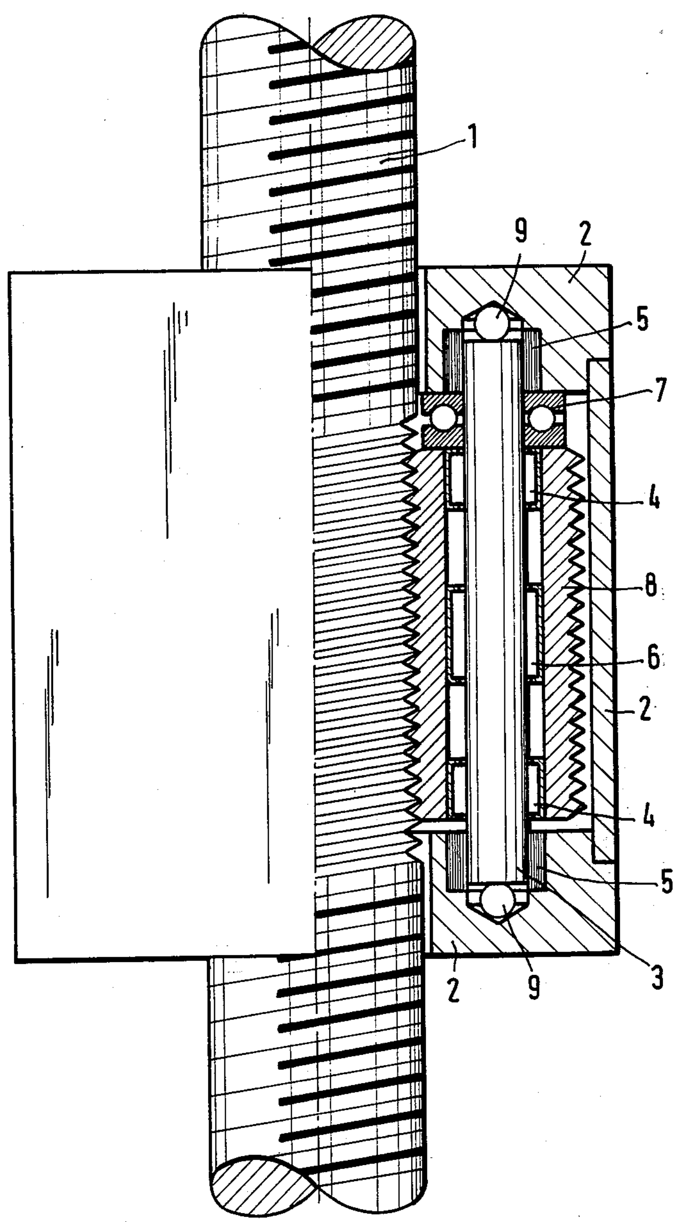

United States Patent [19]

Nussbaum

[11] 4,074,586

[45] Feb. 21, 1978

[54] TRAVELING NUT ASSEMBLY WITH LOW FRICTION AND AUTOMATIC BRAKE

[76] Inventor: Hans Nussbaum, Korker Str. 6, 7641 Bodersweier, Germany

[21] Appl. No.: 745,785

[22] Filed: Nov. 29, 1976

[51] Int. Cl.[2] .................. F16H 1/20

[52] U.S. Cl. .................. 74/424.8 C

[58] Field of Search .................. 74/424.8 C, 89.15

[56] References Cited

U.S. PATENT DOCUMENTS

| | | | |
|---|---|---|---|
| 2,488,256 | 11/1949 | Anderson | 74/424.8 C |
| 3,128,634 | 4/1964 | Eastman | 74/424.8 C |

*Primary Examiner*—William L. Freeh

*Assistant Examiner*—Edward Look

*Attorney, Agent, or Firm*—Wegner, Stellman, McCord, Wiles & Wood

[57] ABSTRACT

A low friction traveling nut assembly carried on a threaded spindle for linear movement therealong in response to rotation of the spindle about its rotational axis includes a housing, a roller rotatably mounted within the housing by roller bearings, and a clutch mechanism which engages when the spindle is rotated in one direction relative to the traveling nut assembly to effect substantial sliding friction between the roller and a bearing surface reacting with the housing so that the traveling nut assembly is automatically braked to resist movement in one axial direction.

11 Claims, 2 Drawing Figures

TRAVELING NUT ASSEMBLY WITH LOW FRICTION AND AUTOMATIC BRAKE

The invention relates to a traveling nut assembly having low friction and an automatic brake in which rolling friction or sliding friction can be selectively achieved between the components forming the nut. In order to develop a lifting and lowering movement, the nut works jointly with a threaded drive spindle. The invention is particularly suited for utilization in mechanisms lifting loads, such as elevating platforms for automotive vehicles.

In designing such a spindle-type elevating platform for automotive vehicles, two conflicting objectives are encountered. One the one hand, low friction forces and high efficiency between the spindle and nut should exist so that the necessary drive power and the stress on the components may be kept low. On the other hand, high friction forces and low efficiency between the spindle and the nut should exist so that automatic braking is present to hold the load lifted in any position without the necessity of an additional brake.

In the well-known spindle-type elevating platforms with a conventional split traveling nut, only the second of these objectives is met. A spindle-type elevating platform employing a planetary-type roller nut of special design provides low friction, but an additional brake is needed. Traveling elements are known where the lift motion is carried out by a nut having reduced friction and the lowering motion is carried out by a cut nut. However, such an arrangement is expensive and has the disadvantage that two traveling elements have to be supervised for reasons of safety.

It is, therefore, a principal object of the invention to provide a frictionless traveling nut in which the two aforementioned objectives are fulfilled optimally by a single nut of simple construction.

In order to obtain automatic braking in one direction, the traveling nut is designed so that rolling friction between individual components can be selectively replaced or supplemented by sliding friction. Rolling friction generates a smaller force than does sliding friction under a similar load. In a traveling nut assembly embodying the invention herein, sliding friction between the components generates a sufficient force to prevent automatic lowering of the load, a braking force substantially equivalent to that encountered if a friction nut were employed. Disposed between one component mounted in a sliding bearing and another component moving relative to the first-named component under rolling friction, a roller-type locking mechanism is appropriately arranged and is dependent on the direction in which the nut is moved so that the rolling friction can be changed over to sliding friction and vice versa.

According to a preferred embodiment, the nut is designed as a planetary roller nut in which a clutch is provided on at least one of the planetary rollers. In order to achieve compact construction, the planetary rollers are rotatably mounted on axles by suitable rollers bearings and the axles in turn, are rotatably positioned in the housing of the nut to react against a sliding bearing. The clutch is arranged between a planetary roller and its respective axle.

In an alternative design, the clutch can be arranged on a shaft or axle rigidly connected with the roller. The clutch is surrounded by an annular component which is rotatable in the nut housing under sliding friction.

Figure 2:
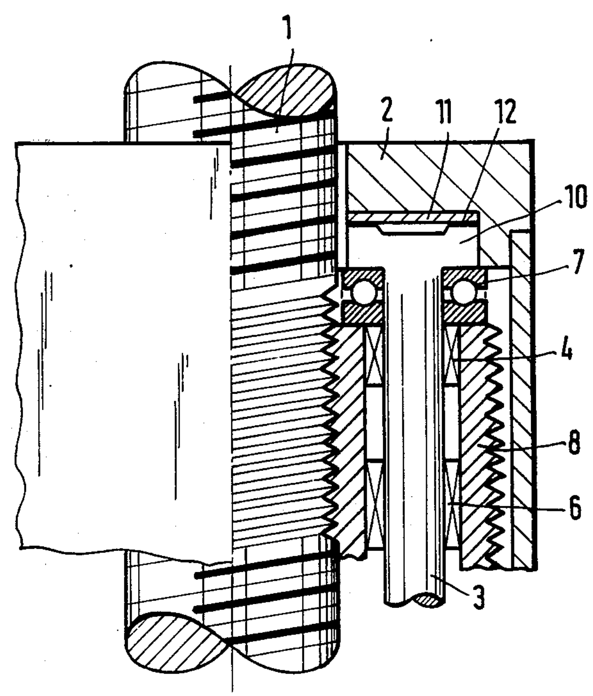

FIG. 1 is a partial cross-sectional view of the traveling nut assembly constructed according to the invention illustrating the automatic braking mechanism; and FIG. 2 is a fragmentary, partial cross-sectional view of an alternative embodiment of the traveling nut assembly.

The traveling nut assembly is a planetary roller nut incorporating a one-way clutch or back pedal brake. The traveling nut includes a housing 2 having axial openings through which a threaded drive spindle 1 having a V-thread extends. An cylindrical axle 3 is mounted within the housing 2 on an axis parallel to the elongate axis of the spindle 1. Journaled on the axle 3 is a planetary roller 8 which cooperatively engages the threaded drive spindle 1. Preferably, the traveling nut assembly has three or more such rollers and axles, each being equally spaced about the periphery of the spindle.

The axle 3 is supported for rotation within the housing 2 at each end by a pair of annular sliding bearings 5 in the radial direction and by a pair of spherical bearings 9 in the axial direction.

The planetary roller 8 has a central bore through which the axle 3 extends, the axle 3 extending axially outward beyond each end thereof. The bore has a diameter greater than the axle 3 so that a space is defined therebetween. Spaced radial roller bearings 4 positioned within the space rotatably mount the planetary roller 8 on the axle 3 to permit relatively friction free rotation.

An axial roller bearing 7 is disposed between the upper surface of the planetary roller 8 and the inner surface of the top of the housing 2. A load acting on the housing 2 is transferred to the planetary roller 8 through the roller bearing 7. When the traveling nut is mounted for rotation upon the threaded drive spindle 1, the traveling nut will move linearly thereon in response to rotation of the spindle 1. If the spindle 1 is rotated counterclockwise on its elongate axis, the traveling nut will move along the spindle threads upwardly. If the spindle 1 is rotated clockwise, the traveling nut will move downwardly.

Positioned within the space defined by the axle 3 and the planetary roller 8 between the spaced roller bearings 4 is a clutch 6, a free wheeling hub with a back pedal brake. The one-way clutch 6 is engaged, when the spindle 1 is rotated clockwise, so that the planetary roller 8 and the axle 3 are locked together so as to prevent relative rotational movement therebetween. During the counterclockwise rotation of the spindle 1 causing the traveling nut to move upwardly, braking action is released so that the planetary roller 8 can freely rotate about the axle 3. The clutch 6 can be designed in a conventional manner. For example, a locking roller mechanism might be employed. Needle bearing roller bodies may be employed as a housing for the clutch 6.

The sliding bearings 5 on both ends of the axle 3 are constructed so that the sliding friction between the respective surfaces is relatively great when the axle 3 rotates to generate the braking force necessary for automatic braking of the traveling nut. This braking force prevents the traveling nut from moving downward until the spindle 1 is rotated to overcome this force. If the traveling nut is moved upward, the axle 3 does not rotate in the bearings 5 because of the sliding friction; however, the clutch 6 is released so that the sleeve-shaped planetary roller 8 rotates about the roller bearings 4 with rolling friction existing on all functioning bearing points. The axle 3 is rotated only when the clutch 6 is engaged as nut is lowered.

Because of the V-thread on the spindle 1 and the inherent angle of the thread, the planetary rollers 8 are pushed radially outward when a load acts on the traveling nut. As a result, the axle 3 in the sliding bearings 5 is pushed radially outward. If the sliding bearings 5 are worn, the axle 3 moves radially outwardly until it is no longer in engagement with the spindle 1. As a safeguard, a follow-up safety nut, such as an ordinary cut nut (not shown), is provided to run along with the traveling nut. Since the safety nut will not normally be subjected to a load, all functions of the traveling nut can be supervised without substantial additional frictional forces.

According to another embodiment which is not shown, shafts or axles are fixed to and extend axially from both ends of the planetary roller. The planetary roller and axle can be constructed integrally if desired. Here, in addition to the radial roller bearing, a one-way clutch is arranged on this fixed shaft and is connected with an annular component which is rotatably disposed within the housing of the traveling nut under sliding friction. With a V-thread on the spindle 1, the one-way clutch in such a construction is appropriately arranged on the outer periphery of the fixed shaft so that the planetary roller can move radially outward when the sliding bearings are worn similar to the embodiment of FIG. 1.

The clutch 6 can cooperate with a radial bearing or with an axial bearing 11 as illustrated in FIG. 2. The axial bearing surface 11 is provided between the axle 3 or a corresponding bearing pivot of the planetary roller 8 according to the embodiment shown in FIG. 2. This bearing surface 11 extends transversely to the direction of the axle 3. The sliding friction required for the generation of the braking force occurs on this bearing surface as soon as the clutch 6 interrupts the rolling friction between the components. Here, the load acting on the housing 2 of the traveling nut would bear on this axial sliding bearing surface 11. Such a construction has the advantage that there does not have to exist any force acting on the planetary roller 8 radially outward in order to produce the bearing pressure on the sliding bearing 11. As a result, a trapezoidal thread can be provided on the threaded spindle 1. In case of wear at the axial sliding bearing surface 11, the planetary roller 8 merely is axially shifted slightly relative to the housing 2.

As seen in FIG. 2, the upper spherical bearing is replaced by the axial sliding bearing 11. The axle 3 has a widened head portion 10 on its upper end on which the housing 2 of the nut rests by way of the sliding bearing 11. The head portion 10 is supported on an axial roller bearing 7 which transfers the load to the planetary roller 8. The sliding surface 12 on the head portion 10 can be made annular in order to deliver the required braking force. If the one-way clutch 6 is engaged during the lowering motion of the traveling nut to lock the axle 3 and the roller 8 together, sliding friction occurs between the annular surface 12 and the sliding bearing 11.

To position the axle 3 radially, a shoulder on the housing 2 is provided against which head portion 10 of the axle 3 bears. An appropriate radial roller bearing may be provided for this purpose. If necessary, the axial sliding bearing 11 can be employed along with a radial sliding bearing 5 as shown in FIG. 1. In the construction shown in FIG. 2, the lower end of the axle 3 can be placed in the housing 2 in any desired way to provide rolling friction or sliding friction.

I claim:

1. A traveling nut assembly carried on a threaded spindle for linear movement therealong in response to rotation of the spindle about its rotational axis, the traveling nut assembly comprising:

a housing through which the spindle extends;

a roller within said housing having a low friction mounting and operatively engaging the spindle;

bearing means carried by said housing; and clutch means responsive to rotation of said roller for selectively effecting frictional engagement between said roller and said bearing means, said clutch means being engaged when the spindle is rotated in one direction so that sliding friction between said roller and said bearing means provides increased resistance to axial movement of the traveling nut on the spindle, said clutch means being disengaged when the spindle is rotated in the other direction so that said roller rotates without substantial resistance.

2. A traveling nut assembly carried on a threaded spindle for linear movement therealong in response to rotation of the spindle about its rotational axis, the traveling nut assembly comprising:

a housing through which the spindle extends;

an axle rotatably mounted within said housing spaced from the spindle;

first bearing means carried by said housing for frictionally reacting with said axle to oppose rotation of said axle relative to said housing;

a roller operatively engaging the spindle and having a bore through which said axle extends;

second bearing means for rotatably mounting said roller on said axle and providing substantially friction free rotation of said roller thereabout; and clutch means for selectively locking said roller to said axle, said clutch means being engaged when the spindle is rotated in one direction so that sliding friction between said axle and said first bearing means provides increased resistance to axial movement of the traveling nut on the spindle, said clutch means being disengaged when the spindle is rotated in the other direction so that said roller rotates about said axle without substantial resistance.

3. The traveling nut assembly of claim 2 wherein said clutch means is a locking roller mechanism.

4. The traveling nut assembly of claim 2 wherein said bore and said axle have circular cross sections, at least a portion of said bore having a diameter greater than said axle so as to define an annular space between said axle and said roller, and said clutch means being disposed within the space between said axle and said roller.

5. The traveling nut assembly of claim 4 wherein said second bearing means is a roller bearing disposed within the space between said axle and said roller.

6. The traveling nut assembly of claim 5 further including a second roller bearing disposed within the space between said axle and said roller remote from the first-named roller bearing, said clutch means being disposed between said roller bearings.

7. The traveling nut assembly of claim 2 wherein said axle extends beyond the opposite ends of the roller, said first bearing means rotatably mounting at least one end of said axle, the surface of said axle sliding relative to the surface of said first bearing means.

8. The traveling nut assembly of claim 7 wherein said first bearing means is annularly disposed about the circumferential surface of said axle and provides a radial load bearing suface.

9. The traveling nut assembly of claim 8 wherein the opposite ends of said axle are each mounted within a radial load bearing surface at the respective ends of said housing.

10. The traveling nut assembly of claim 2 wherein said first bearing means is positioned at one end of said axle, a load on said housing causing frictional engagement in an axial direction between the axial end of said axle and said first bearing means.

11. The traveling nut assembly of claim 2 wherein said traveling nut assembly is a planetary roller nut with a plurality of rollers mounted on an equal number of axles, clutch means being provided for at least one of the axle and roller subassemblies.

* * * * *